Patented Mar. 14, 1950

2,500,435

UNITED STATES PATENT OFFICE 2,500,435

PENTOSAN AND FEED CONCENTRATES FROM COTTONSEED HULLS

Henry Edwin Shiver, Spartanburg, S. C., assignor to The Quaker Oats Company, Chicago, Ill., a corporation of New Jersey No Drawing. Application May 21, 1948, Serial No. 28,518

8 Claims. (Cl. 99—2)

This invention relates to the processing and utilization of cotton seed hulls.

The normal production of cotton seed hulls in the United States is in excess of one million tons per year. These hulls are largely regarded as an agricultural waste, or residue, because of their low economic value.

However, cotton seed hulls contain valuable ingredients including pentosans, fat and protein, but the concentration of these ingredients in the whole hulls is too low to permit them to be used economically, considering the cost of handling and transporting such a light and bulky substance, and of chemically processing it.

A concentrated source of pentosans is valuable, such as for conversion to xylose by dilute acid hydrolysis which is substantially quantitative, and thence to furfural, the latter having extensive industrial application, one of its recent uses being as a substitute for certain coal tar chemicals in the manufacture of nylon.

On the other hand, the fat and protein ingredients of cotton seed hulls are valuable as feedstuff apart from the pentosans which have little or no food value. However, the low concentration of these ingredients in the whole hulls is a detergent to the full utilization thereof as a source of nutrition.

I have found that it is possible to process economically cotton seed hulls in such a manner as to obtain a material containing a high concentration of pentosans useful as a raw material in the manufacture of furfural, and a material containing a high concentration of fat and protein useful as a stock feed, or as an enriching agent therefor.

I have also found that when cotton seed hulls, preferably in a delinted form, is subjected to disintegration by attrition, the particles first removed contain relatively high concentrations of fat and protein, and substantial amounts of carbohydrates, the concentration of pentosans being relatively small. Attrition, as used herein, is essentially the action of rubbing or abrading, thus imparting the tendency to wear or shear off particles at the surfaces on both sides and leave a smooth residual core thereby achieving the purpose largely through longitudinal cleavage as distinguished from cross sectional breaking resulting from direct pressure or impact.

When the attritional disintegration referred to is continued to within the range of about 48 to 60 percent, preferably 45 to 50 percent, disintegration of the hulls, by weight, there results two fractions (1) the finely divided cleaved particles containing a high concentration of fat, protein, and high quality carbohydrates, and (2) the coarser residual particles, identified as the palisade cells of the hulls, containing a high concentration of pentosans. Further disintegration may increase somewhat the pentosan concentration in the coarser fraction, but would dilute the concentration of the nutritional ingredients in the finer fraction. Accordingly, I prefer to arrest the disintegration action when the concentration of the nutritional ingredients of the finer fraction on the one hand, and the pentosan concentration of the coarser fraction on the other hand, are at a maximum relative to each other. This usually falls within the range of 40 to 60 percent disintegration, but will vary with different types of hulls.

In carrying out my invention hulls with the usual lint fibers thereon may be used, but I prefer to use delinted cotton seed hulls, that is, hulls from which the lint has been substantially removed (about 75 percent or more). Various attrition mills may be employed for the disintegration, such as the Bauer attrition mill. I also prefer to conduct the disintegration so that the finely divided particles removed will pass a 50 to 60 mesh screen, leaving the residual portions of the hulls on the screen. The two fractions obtained may be thus separated readily. However, due to the difference in densities between these two fractions, it is possible to use other separation methods, such as flotation, winnowing, etc., wherein advantage is taken of density differences, rather than of differences in particle size. Other screening levels may be employed in accordance with this invention, but the 50 to 60 mesh level has been found to produce the optimum results.

In carrying out my invention as aforesaid, I have found that the pentosan concentration of the residual or coarser fraction is about 1½ times the pentosan concentration of the whole hulls. In the first or finely divided fraction the fat concentration is about 2 or more times the fat concentration of the original whole hulls, and the protein concentration about 1⅔ the protein concentration of the original whole hulls. A significant increase in the quality of the carbohydrates in the latter fraction also obtains.

The following examples will illustrate my invention and the manner in which it may be practiced, but they are not to be construed as limiting the scope thereof.

EXAMPLE 1

A batch of cotton seed hulls with the usual lint thereon containing 35.2 percent pentosans on a lint-free basis was subjected to attritional distintegration in a 36 inch, 1800 R. P. M. attrition mill having a plate opening of 0.01 inch, and the distintegration continued until 52.3 percent by weight of the material would pass through a 50 mesh screen. The remaining portion consisted of linters and 37.3 percent of a coarse fraction that stayed on the screen. The latter portion was found to contain 44.41 percent pentosans. The other portion was found to contain only 18.96 percent pentosans. The pentosan content was determined by conversion to furfural and precipitation of the latter as the phloroglucide.

Additional batches of such hulls were disintegrated using plate openings of 0.05, 0.075, and 0.10 inch, respectively, in the attrition mill. The results thus obtained, together with those of the first batch, are tabulated below.

Table A

| Plate Opening | On Screen | | Through Screen | |
|---|---|---|---|---|
| | Amount | Pentosan Content | Amount | Pentosan Content |
| | Per cent | Per cent | Per cent | Per cent |
| 0.01 inches | 37.3 | 44.41 | 52.3 | 18.96 |
| 0.05 inches | 51.1 | 48.10 | 39.0 | 13.49 |
| 0.075 | 54.9 | 43.46 | 34.6 | 14.16 |
| 0.10 | 54.8 | 42.22 | 33.1 | 10.28 |

EXAMPLE 2

In a similar manner, batches of delinted cotton seed hulls were subjected to attritional disintegration followed by screening and the results obtained are tabulated below.

Table B

| Plate Opening | On Screen | | Through Screen | |
|---|---|---|---|---|
| | Amount | Pentosan Content | Amount | Pentosan Content |
| | Per cent | Per cent | Per cent | Per cent |
| 0.01 inches | 43.1 | 49.20 | 53.8 | 18.81 |
| 0.05 inches | 51.4 | 51.26 | 45.4 | 13.97 |
| 0.075 inches | 53.5 | 45.01 | 43.7 | 13.68 |
| 0.10 inches | 54.9 | 43.11 | 42.2 | 11.63 |

EXAMPLE 3

Batches of cotton seed hulls with the usual lint thereon were subjected to disintegration as in Examples 1 and 2, and the fractions obtained therefrom were analyzed for their protein, fat, ash, and carbohydrate content by the conventional methods of analysis of stock feed, the results being tabulated below, all percentages given being on a dry basis.

Table C

| | Protein | Fat | Ash | Carbohydrates | |
|---|---|---|---|---|---|
| | | | | Fiber | Nfe |
| | Per cent | Per cent | Per cent | Per cent | Per cent |
| Original content | 2.89 | 1.02 | 2.53 | 42.69 | 40.85 |
| Coarser fraction | 2.08 | 0.34 | 2.24 | 36.57 | 48.72 |
| Finer fraction | 5.26 | 1.06 | 4.20 | 40.22 | 32.25 |

EXAMPLE 4

Same as Example 3 for delinted cotton seed hulls.

Table D

| | Protein | Fat | Ash | Carbohydrates | |
|---|---|---|---|---|---|
| | | | | Fiber | Nfe |
| | Per cent | Per cent | Per cent | Per cent | Per cent |
| Original content | 3.07 | 0.51 | 2.29 | 38.17 | 45.72 |
| Coarser fraction | 1.75 | 0.16 | 1.96 | 35.39 | 51.84 |
| Finer fraction | 4.83 | 1.14 | 3.90 | 39.48 | 40.37 |

I claim:

1. The method comprising subjecting cotton seed hulls to attritional disintegration so as to remove progressively in finely divided form portions thereof exposed on both sides, in a form sufficiently sub-divided to pass through a screen of about 50 to 60 mesh, continuing the disintegration until the quantity thus sub-divided constitutes about 40 to 60 percent by weight of the original hulls, then separating the finely divided portions from the remaining portions.

2. The method comprising subjecting cotton seed hulls to attritional disintegration so as to remove progressively in finely divided form portions thereof exposed on both sides, continuing the disintegration until about 40 to 60 percent, by weight, of the hulls have been thus disintegrated, then separating the finely divided portions from the remaining portions.

3. The method comprising subjecting cotton seed hulls to attritional disintegration so as to remove progressively in finely divided form portions thereof exposed on both sides, continuing the disintegration until about 45 to 50 percent, by weight, of the hulls have been thus disintegrated, then separating the finely divided portions from the remaining portions.

4. The method comprising subjecting delinted cotton seed hulls to attritional disintegration so as to remove progressively in finely divided form portions thereof exposed on both sides, in a form sufficiently sub-divided to pass through a screen of about 50 to 60 mesh, continuing the disintegration until the quantity thus sub-divided constitutes about 40 to 60 percent by weight of the original hulls, then separating the finely divided portions from the remaining portions.

5. The method comprising subjecting delinted cotton seed hulls to attritional disintegration so as to remove progressively in finely divided form portions thereof exposed on both sides, continuing the disintegration until about 40 to 60 percent, by weight, of the hulls have been thus disintegrated, then separating the finely divided portions from the remaining portions.

6. The method comprising subjecting delinted cotton seed hulls to attritional disintegration so as to remove progressively in finely divided form portions thereof exposed on both sides, continuing the disintegration until about 45 to 50 percent, by weight, of the hulls have been thus disintegrated, then separating the finely divided portions from the remaining portions.

7. The method comprising subjecting cotton seed hulls to attritional disintegration to release the exterior portions of both sides of said hulls from the palisade portions and separating the released portions from the palisade portions.

8. The method comprising subjecting delinted cotton seed hulls to attritional disintegration to release the exterior portions of both sides of said hulls from the palisade portions and separating the released portions from the palisade portions.

HENRY EDWIN SHIVER.

REFERENCES CITED

The following references are of record in the file of this patent:

UNITED STATES PATENTS

| Number | Name | Date |
|---|---|---|
| 2,064,158 | Harrell et al. | Dec. 15, 1936 |
| 2,082,198 | Bauer | June 1, 1937 |

FOREIGN PATENTS

| Number | Country | Date |
|---|---|---|
| 522,614 | Great Britain | 1940 |